United States Patent [19]

Konishi et al.

[11] Patent Number: 4,522,274
[45] Date of Patent: Jun. 11, 1985

[54] COMBINATORIAL WEIGHING METHOD

[75] Inventors: Satoshi Konishi, Shiga; Takashi Sashiki, Nagaokakyo, both of Japan

[73] Assignee: Kabushiki Kaisha Ishida Koki Seisakusho, Kyoto, Japan

[21] Appl. No.: 439,595

[22] Filed: Nov. 5, 1982

[30] Foreign Application Priority Data

Nov. 10, 1981 [JP] Japan ............... 56-180674

[51] Int. Cl.³ ............... G01G 19/22; G01G 13/02
[52] U.S. Cl. ............... 177/25; 177/70; 177/123
[58] Field of Search ............... 177/25, 70, 122, 123

[56] References Cited

U.S. PATENT DOCUMENTS

| | | | |
|---|---|---|---|
| 4,206,822 | 6/1980 | Mazzucchelli | 177/70 X |
| 4,336,853 | 6/1982 | Hirano | 177/25 |
| 4,360,070 | 11/1982 | Hirano | 177/25 |
| 4,397,364 | 8/1983 | Hirano | 177/25 |
| 4,398,613 | 8/1983 | Hirano | 177/25 |
| 4,473,126 | 9/1984 | Hirano | 177/70 |

Primary Examiner—George H. Miller, Jr.
Attorney, Agent, or Firm—Staas & Halsey

[57] ABSTRACT

A combinatorial weighing method for obtaining a mixture of articles of plural categories, wherein the articles in each category are contained in the mixture at a number ratio equal or closest to a target number ratio, and wherein the mixture has a total weight equal or closest to a target weight. The method includes setting a number for each category of articles so as to provide a number ratio closest to a target number ratio, and measuring the total weight of a primary mixture obtained by extracting the set number of articles in each category and mixing these articles. A weight shortfall, which is the difference between the total weight of the primary mixture and the target weight, is computed, and a plurality of weighing machines are supplied with supplemental articles to make up for the shortfall. An optimum combination of weighing machines giving a weight equal or closest to the shortfall, is selected and a final mixture is obtained by discharging supplemental articles from the selected weighing machines and mixing these articles with the primary mixture.

13 Claims, 6 Drawing Figures

COMBINATORIAL WEIGHING METHOD

CROSS-REFERENCE TO RELATED APPLICATION

This application is related to U.S. application Ser. No. 402,364 filed July 27, 1982 and assigned to the Assignee of the subject application.

BACKGROUND OF THE INVENTION

This invention relates to a method of combinatorially weighing a mixture and, more particularly, to a combinatorial weighing method which employs a single combinatorial weighing unit and a single automatic weighing unit having two or more counter mechanisms for providing an article mixture, wherein the various article categories are incorporated in the mixture at a desired target ratio in terms of the number of articles in each category, while the total weight of the mixture is that which is equal or closest to a target weight value.

It is common practice to adopt so-called combinatorial weighing and combinatorial counting in order to weigh and count articles with great accuracy.

When it is desired to obtain a batch of articles of a target weight through combinatorial weighing, n-number of weighing machines are supplied with the articles, wherein there is a small difference in the weight supplied from one machine to the next. Each weighing machine separately weighs the group of articles supplied to it, all possible combinations of the resulting weight values are found and the sum of the weight values in each and every combination is computed. Then, from among all combinations found, there is selected one combination the sum of whose weight values is equal to a target weight or closest to the target weight within preset allowable limits. Articles are discharged from those weighing machines belonging to this selected combination, thereby providing a batch of articles of the target weight.

When it is desired to obtain a batch of specified articles of a target number through combinatorial counting, n-number of weighing machines are supplied with the articles, wherein there is a small difference in the weight supplied from one machine to the next. Each weighing machine separately weighs the group of articles supplied to it, each resulting weight value is divided by the unit weight of the articles to provide the number of the articles in each weighing machine, all possible combinations of the resulting numbers are found and the sum of the numbers in each and every combination is computed. Then, from among all combinations found, there is selected one combination the sum of whose numbers is equal to a target number or closest to the target number within preset allowable limits. Articles are discharged from those weighing machines belonging to this selected combination, thereby providing a batch of articles of the target number.

The above-mentioned combinatorial weighing and counting methods are applicable to articles of a single variety or to a mixture of different articles where the ratio of the various categories of articles in the mixture is predetermined. While the articles can be weighed and counted with great accuracy in both cases, it has not been possible to obtain a mixture of plural categories of articles wherein the number ratio of the article categories constituting the mixture takes precedence over the overall target weight. More specifically, in a case where it is desired to set (a) a target number ratio for the article categories constituting the mixture (in other words, where it is desired to acquire a specific number of articles in each category), (b) the total weight (target weight) of the mixture and (c) the total number (target number) of all the articles constituting the mixture, it has not been possible to obtain a mixture wherein the articles in each category are contained in the mixture at the number ratio equal or closest to the target number ratio and, at the same time, wherein the mixture has a total article number or total weight equal or closest to the target number and target weight, respectively.

It has been proposed, therefore, to provide one counting mechanism for each category of articles, count out the number of articles in each category on the basis of the target number ratio, discharge the articles in the numbers counted out by each counting apparatus, and gather these discharged articles into a mixture. Although the number ratio of the various articles constituting the mixture and the total number of the articles in the mixture can be brought into agreement with the respective target values by employing the proposed method, the mixture so obtained will not satisfy the target weight requirement.

SUMMARY OF THE INVENTION

Accordingly, an object of the present invention is to provide a combinatorial weighing method and apparatus through which it is possible to obtain a mixture of articles in which the articles in each category are contained in the mixture at a number ratio equal or closest to a target number ratio, which mixture will have a total article number and total weight equal or closest to a target number and target weight, respectively.

Another object of the present invention is to provide a combinatorial weighing method and apparatus through which a mixture of articles can be weighed with great accuracy.

In accordance with the present invention, these and other objects are attained by providing a combinatorial weighing method characterized by setting a number for each category of articles so as to provide a number ratio closest to a target number ratio, measuring the total weight of a primary mixture obtained by extracting the set number of articles in each category and mixing these articles, computing the weight shortfall, which is the difference between the total weight of the primary mixture and the target weight, supplying a plurality of weighing machines with supplemental articles to make up for the shortfall, selecting an optimum combination of weighing machines giving a weight equal or closest to the shortfall, and obtaining a final mixture by discharging supplemental articles from the selected weighing machines and mixing these articles with the primary mixture.

Other features and advantages of the invention will be apparent from the following description in connection with the accompanying drawings.

BRIEF DESCRIPTION OF THE DRAWINGS

FIGS. 1 through 4 illustrate a combinatorial weighing system useful in describing a weighing method in accordance with the present invention, in which:

FIG. 1 is a simplified top view;

FIG. 2 is a simplified front view;

FIG. 3 is an enlarged side view, partially in section, showing a counting device;

FIG. 4 is a block diagram useful in describing the counting method; and

FIG. 5, including

DESCRIPTION OF THE PREFERRED EMBODIMENT

Figure 1:
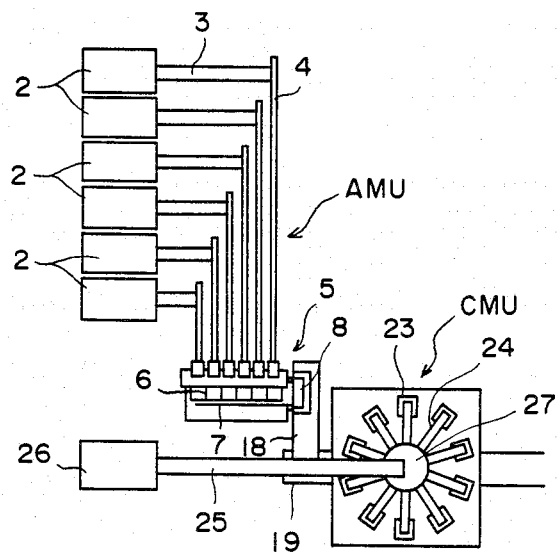
Figure 2:
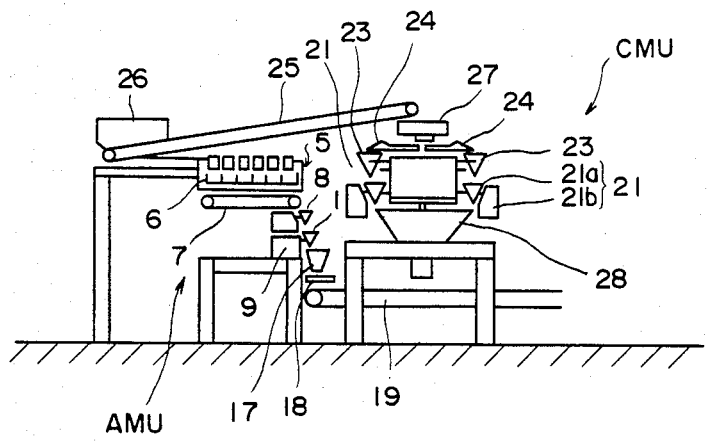
Figure 3:
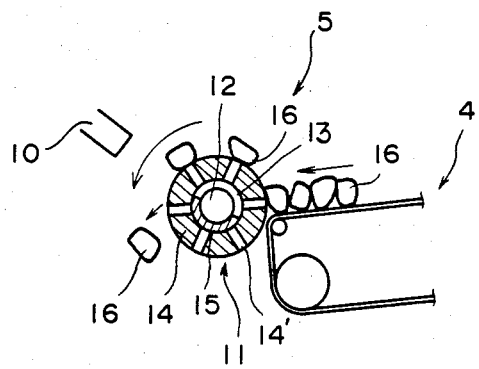

Referring to FIGS. 1 through 3, a combinatorial weighing system for practicing the method of the present invention comprises an automatic weighing unit AMU having a plurality of counters and a single weighing machine, and a combinatorial weighing unit CMU for weighing supplemental articles, described hereinbelow.

In describing the system, we will assume that a mixture is composed of six types or categories of articles A, B, C, D, E and F. For each article category, a value is set specifying the number of articles to be discharged or dispensed in a primary discharge operation to provide a primary mixture of the articles A through F having a number ratio close to a target number ratio. For instance, the number of articles of article categories A, B, C, D, E and F to be discharged to provide the primary mixture can be 3, 4, 5, 6, 5 and 5, respectively. We will also assume that the articles of types E and F are employed to constitute supplemental articles which will make up for any weight shortfall, namely for any difference between the total weight of the primary mixture and a target weight set for the final mixture. The supplemental articles comprise the articles of categories E and F at a number ratio which compensates for any difference between the number ratio in the primary mixture and the target number ratio in the final mixture. Namely, if the number of articles in categories A, B, C, D, E and F in the primary mixture is 3, 4, 5, 6, 5 and 5 respectively, while the target number ratio of article categories A, B, C, D, E and F is 3, 4, 5, 6, 7 and 8 respectively, the number ratio of the supplemental articles of article categories E and F is 2:3.

As shown in FIGS. 1 and 2, the automatic weighing unit AMU includes a weighing hopper 1, a plurality of charging hoppers 2 for accumulating corresponding articles A through F, contiguous belt conveyor pairs 3, 4 disposed for conveying articles from each of the charging hoppers 2 to the weighing hopper 1, counters 5 provided for corresponding ones of the conveyor pairs 3, 4, first hoppers 6 provided for corresponding ones of the counters 5, a gathering conveyor 7 for receiving and conveying the articles A through F, one second hopper 8 for temporarily retaining the articles delivered by the conveyor 7, which articles constitute a primary mixture, and a weight sensor 9 for weighing the articles charged into the weighing hopper 1 from the second hopper 8.

In FIG. 3, which is a side view showing one of the counters 5 associated with one of the conveyors 4, it will be seen that the counter 5 comprises a photo-electric sensor 10 and a counter drive mechanism 11. The latter is composed of a stationary shaft 12, a rotary body 14 fit over the shaft 12 through the intermediary of an annular clearance through which air may pass, and a stationary arcuate sealing member 15 affixed to the outer circumferential surface of the stationary shaft 12, the sealing member 15 having an arc of a prescribed length. The rotary body 14 is provided with a plurality of radially directed suction bores 14' spaced apart by equal angles and communicating with the annular clearance 13. In operation, a drive mechanism (not shown) drives the rotary body 14 into rotation while air is withdrawn from the annular clearance 13. As a result, articles 16 delivered by the belt conveyor 4 are attracted to the rotary body 14 due to suction produced at the suction bores 14' and are carried along with the rotary body as it rotates. When a suction bore 14' is rotated to the position of the stationary sealing member 15 and is cut off by the sealing member from the suction prevailing in the annular clearance 13, the article 16 being carried by the suction bore 14' is released and dropped into a corresponding one of the first hoppers 6. Each time an article 16 is carried and released into the first hopper 6 in this fashion, the event is sensed by the photo-electric sensor 10. Thus, through a suitable arrangement including the photo-electric sensor 10, the number of articles 16 conveyed by the rotary body 14 is counted and, when the desired number of articles has been so conveyed, the rotary body is stopped.

Returning to FIG. 2, the automatic counting unit AMU also includes a chute 17 for collecting the primary mixture discharged from the weighing hopper 1. Belt conveyors 18, 19 are provided, as best shown in FIG. 1. Belt conveyor 18 extends from below the weighing hopper 1 to one end of the belt conveyor 19, whose other end leads to a packaging machine (not shown).

In the above arrangement, a number is set for each category of articles that, when mixed, will constitute the primary mixture. As described above, the articles of the categories A through F counted out in accordance with each setting are charged into the weighing hopper 1 to form the primary mixture the total weight $W_1$ of which is weighed by the weight sensor 9 of the automatic weighing unit AMU. As will be described below, a signal indicative of the total weight $W_1$ is delivered to a computation control unit, after which the primary mixture is discharged from the weighing hopper 1.

The combinatorial weighing unit CMU comprises n-number of equally spaced apart weighing machines 21 disposed in a circular array along the perimeter of the unit, each weighing machine being composed of a weighing hopper 21a and a weight sensor 21b; pool hoppers 23 for supplying corresponding ones of the weighing hopper 21a with articles; supply troughs 24 for supplying corresponding ones of the pool hoppers 23 with articles in such a manner that the articles supplied differ by a constant amount from one pool hopper to another; and a distributing feeder 27 for distributively supplying each of the supply troughs 24 with articles obtained from a charging hopper 26 via a belt conveyor 25.

The supplemental articles; namely, the articles of types E and F for supplementing the primary mixture, are loaded in the charging hopper 26. With regard to the articles E and F loaded in the hopper 26, the ratio of the number of articles E to that of the articles F in the load is determined by first subtracting the numbers which were set previously for each of the article categories to obtain the primary mixture, from the respective numbers of articles of each category that are to make up the final or target mixture, thereby to find the difference or shortfall for each category. Once these have been found, it is the ratio of the shortfall for the category E articles to that for the category F articles that gives the above-mentioned ratio of the articles E, F to be loaded in the hopper 26. An illustrative example in which this ratio is found, will be described below. It should be noted that the amount of supplemental articles required for compensating the primary mixture preferably is small in order to enhance the accuracy of the number of articles in the final mixture.

An operational control unit to be described later is adapted to store in memory the total weight $W_1$ of the primary mixture, measured by the automatic weighing unit AMU, as well as a weight shortfall $W_2$ obtained by subtracting the total weight $W_1$ from a target weight $W$. Also stored in memory by the operational control unit are weight values $Wr_1, Wr_2, \ldots, Wr_n$ measured by the corresponding weight sensors 21b, 21b ... of the weighing machines 21, 21 . . . , as well as the numbers of articles $Nr_1, Nr_2, \ldots, Nr_n$ in respective ones of these weighing machines, obtained by dividing the weight values $Wr_1, Wr_2, \ldots, Wr_n$ by the mean unit weight $W_m$ of the supplemental articles. Note that the quotients obtained from the division operation are rounded off to the nearest whole number to give $Nr_1$ through $Nr_n$. It should also be noted that the mean unit weight $W_m$ of the supplemental articles is determined by:

$$W_m = (e \cdot W_e + f \cdot W_f)/(e+f)$$

where $W_e$ stands for the weight of the articles E, $W_f$ for the weight of the articles F, and the ratio of the number of supplemental articles E to that of the supplemental articles F is e:f.

In a case where weight is to take precedence over the number of articles, the operational control unit computes all combinations of the weight values $Wr_1, Wr_2, \ldots, Wr_n$, retrieves those combinations giving a combined weight equal or closest to the weight shortfall $W_2$, selects from these latter combinations one which gives a combined number closest to a shortfall in the total number of articles, and causes the weighing hoppers 21a, 21a . . . of the weight machines corresponding to the selected combination to discharge their supplememental articles.

On the other hand, in a case where the number of articles is to take precedence over weight, the operational control unit computes all combinations of the numbers of articles $Nr_1, Nr_2, \ldots, Nr_n$, retrieves those combinations giving a combined number equal or closest to the shortfall in the total number of articles, selects from these latter combinations one which gives a combined number closest to the weight shortfall $W_2$, and causes the weighing hoppers 21a, 21a . . . of the weighing machines corresponding to the selected combination to discharge their supplemental articles.

Returning to FIG. 2, the combinatorial weighing unit CMU also includes a collecting chute 28 for collecting the supplemental articles discharged by the selected weighing hoppers 21a, 21a . . . and for dropping these articles onto the belt conveyor 19 alongside the primary mixture previously discharged onto the belt conveyor from the weighing hopper 1 of the automatic weighing unit AMU.

To gain an understanding of the method according to the present invention, the operation of the foregoing system will be described with reference to the block diagram of FIG. 4 where the conditions are as follows: The final mixture is composed of articles of types A, B, C, D, E and F, with the numbers of these articles in the final mixture to be 3, 4, 5, 6, 7 and 8, respectively. The primary mixture also will be made up of the articles A, B, C, D, E and F, and the numbers set in advance for these categories will be 3, 4, 5, 6, 5 and 5, respectively. Thus, the primary mixture will be corrected to obtain the desired final mixture by supplemental articles composed of articles E and F mixed at a ratio of 2:3 (which ratio is obtained by subtracting the set numbers 5, 5 from the numbers 7, 8 to be incorporated in the final mixture). It will also be assumed that the articles E and F have approximately equivalent unit weights.

Figure 4:
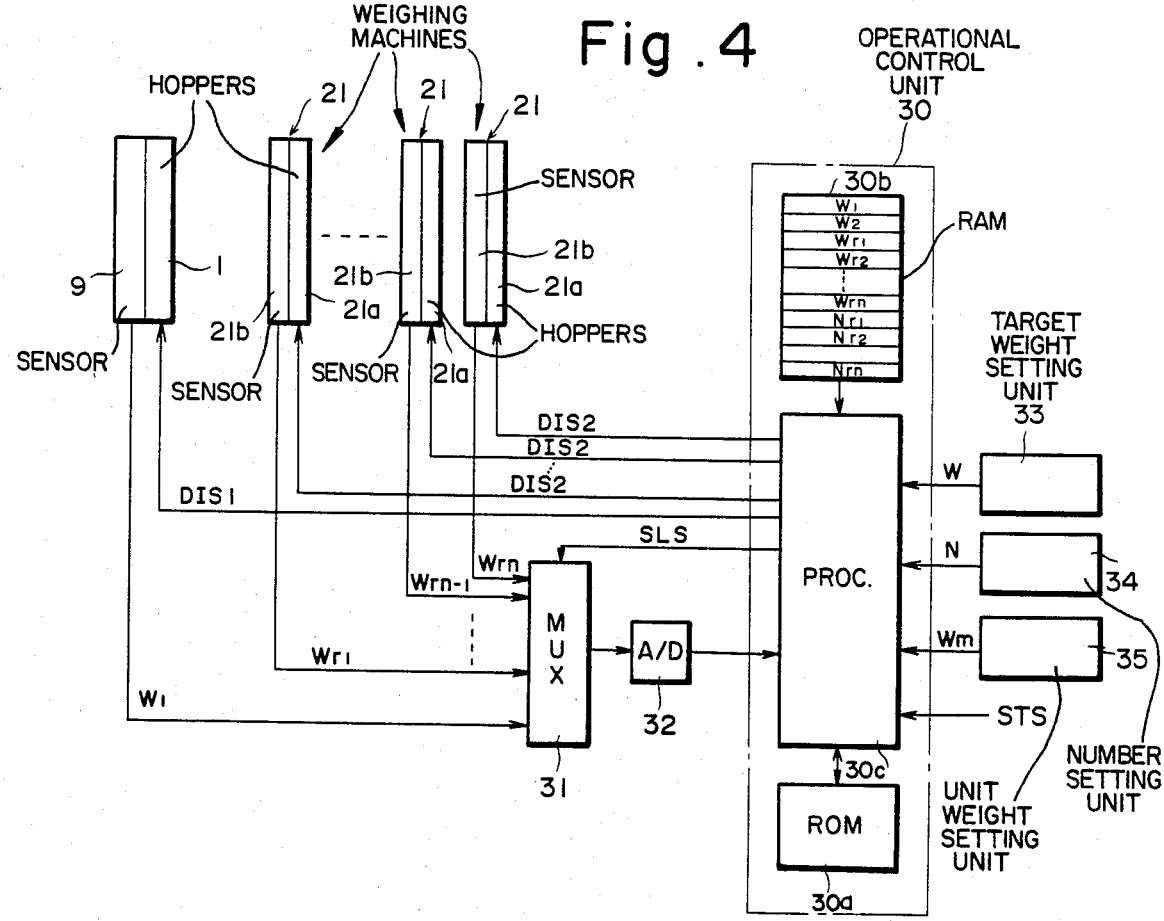

Referring to FIG. 4, numeral 30 denotes the aforementioned operational control unit constituted by a microcomputer or the like and including a ROM 30a which stores the program for combinatorial processing, a RAM 30b for storing data, and a processor 30c. The operational control unit 30 executes such operations as storing in memory the weight value $W_1$ delivered by the weight sensor 9 of automatic weighing unit AMU and the weight values $Wr_1, Wr_2, \ldots Wr_n$ delivered by the weight sensors 21b, 21b ... of the combinatorial weighing unit CMU, and computing combinations based on these values. It also controls the weighing operation of the weight sensor 9 and weight sensors 21b. A multiplexer 31 comprising analog switch means or the like, receives the values $W_1$ and $Wr_1$ through $Wr_n$ from the above mentioned weight sensors and delivers its output to an analog/digital (A/D) converter 32, whose digital output is applied to the processor 30c. Also connected to the processor 30c are a target weight setting unit 33 for setting the target weight $W$ of the final mixture, a number setting unit 34 for setting the number of supplemental articles (namely a shortfall number N obtained by adding the numerical shortfall for the articles E and F, and a unit weight setting unit 35 for setting the mean unit weight $W_m$ of the articles E and F. An alternative to setting the shortfall number N would be to set a target number for the total number of articles in the final mixture by subtracting the total number of articles in the primary mixture from the target number, thereby giving the shortfall number N.

Figure 5A:
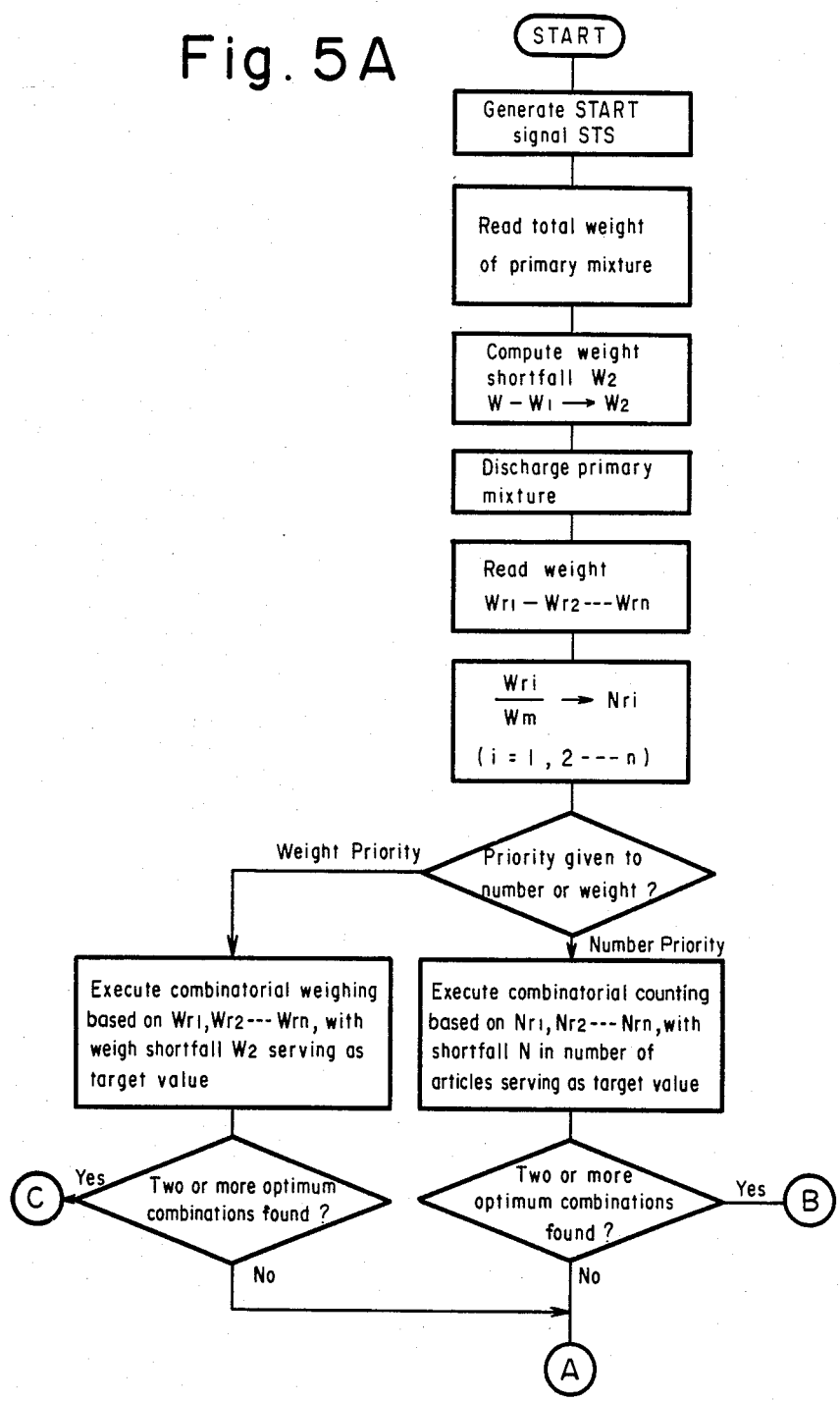
FIGS. 5A and 5B, is a flowchart useful in describing a combinatorial weighing method according to the present invention.
Figure 5B:
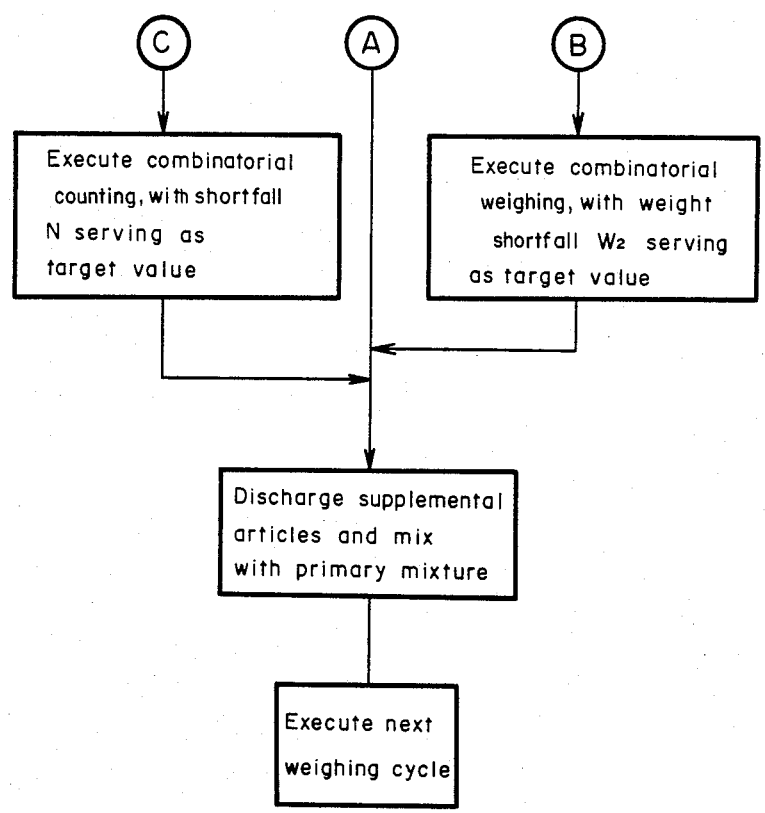

In the weighing operation of the combinatorial weighing system, the primary mixture, made up of the articles A, B, C, D, E and F (which are 3, 4, 5, 6, 5 and 5 in number, respectively) is charged into the weighing hopper 1 of the automatic weighing unit AMU, and small amounts of the supplemental articles are charged into the weighing hoppers 21a, 21a ... of the weighing machines 21, 21 . . . belonging to the combinatorial weighing unit CMU. When the packaging machine (not shown) for receiving the mixture from the belt conveyor 19 is ready, a start signal STS is applied to the operational control unit 30. The latter then begins excuting processing as illustrated by the flowchart of FIG. 5. Specifically, upon receiving the start signal STS, the operational control unit 30 sends a selection signal SLS to the multiplexer 31 which responds by first delivering a signal indicative of the weight of the primary mixture weighed by the automatic weighing unit AMU. The signal, which is in analog form, indicates the total weight $W_1$ of the 28 articles of types A through F counted out by the counters. This signal is applied to the A/D converter 32 for conversion into a digital quantity which is stored as $W_1$ in the RAM 30b by the processor 30c. The operational control unit 30 subtracts the total weight $W_1$ from the target weight $W$ set by the target weight setting unit 33, thereby computing the weight shortfall $W_2$ which is then stored in the RAM 30b. Next, the control unit 30 sends a discharge signal $DIS_1$ to the weighing hopper 1 which responds by discharging the primary mixture.

Next, the operational control unit 30 sends the selection signal SLS to the multiplexer 31 to read in the weight values $Wr_1, Wr_2, \ldots Wr_n$ successively from the weight sensors $21b, 21b \ldots$ of the combinatorial weighing unit CMU through the A/D converter 32. The resulting digital values of $Wr_1, Wr_2, \ldots Wr_n$ are stored in those storage regions of RAM $30b$ corresponding to weight sensors $21b, 21b \ldots$, and each of these values is divided by the mean unit weight $W_m$ to give the series of articles numbers $Nr_1$, Nrhd 2, $\ldots$, $Nr_n$, which are rounded off to the nearest whole number. These also are stored in predetermined storage areas of the RAM $30b$.

We will now assume that the shortfall N ($=5$) in the number of articles to be made up for by the supplemental articles is to take precedence; namely, that priority will be given to obtaining the target number of articles (33) in seeking a mixture whose total weight is equal or closest to the target weight W. In such case, the first step is to compute all combinations of the numbers $Nr_1$, $Nr_2, \ldots, Nr_n$ stored in the RAM, retrieve those combinations thereof that give a combined number equal or closest to the shortfall N in the number of articles, select from these latter combinations one which gives a combined weight equal or closest to the weight shortfall $W_2$, and apply a discharge signal $DIS_2$ to those weighing hoppers $21a, 21a \ldots$ of the weighing machines 21, 21 . . . corresponding to the selected combination, whereby these weight hoppers are caused to discharge their supplemental articles onto the belt conveyor 19 alongside the already discharged primary mixture.

For a more detailed description of combinatorial counting and combinatorial weighing, see FIGS. 1 and 4 and the related descriptions in the specification and drawings of U.S. Pat. No. 4,418,772.

Next we will assume that the weight shortfall $W_2$ to be made up for by the supplemental articles is to take precedence; namely, that priority will be given to obtaining the target weight W in seeking a mixture whose total number of articles is closest to 33. This is the converse of the previous case. Thus, the first step is to compute all combinations of the weight values $Wr_1$, $Wr_2, \ldots, Wr_n$ stored in the RAM, retrieve those combinations thereof that give a combined weight equal or closest to the weight shortfall $W_2$, select from these latter combinations the one which gives a combined number equal to or closest to the shortfall N ($=5$) in the number of articles, and apply the discharge signal $DIS_2$ to those weighing hoppers $21a, 21a \ldots$ of the weighing machines 21, 21 . . . corresponding to the selected combination, whereby these weighing hoppers are caused to discharge their supplemental articles onto the belt conveyor 19 alongside the already discharged primary mixture.

Mixing the primary mixture from the automatic weighing unit AMU with the supplemental articles from the combinatorial weighing unit CMU provides a mixture constituted by the articles of categories A through F at the target number ratio prescribed for these categories. At the same time, the mixture has the target weight.

In the foregoing embodiment of the invention, the weight shortfall $W_2$ exhibited by the primary mixture was corrected by supplemental articles composed of articles E and F of approximately the same unit weight. However, this embodiment is in no way restrictive in nature, as the supplemental articles can be composed of articles from all categories A through F to correct for the shortfall. Alternatively, articles from only one of the above categories may be used to form the supplemental articles if so desired.

In accordance with the present invention as described and illustrated hereinabove, it is possible to obtain a mixture of articles in which the articles in each category are contained in the mixture at a number ratio equal or closest to a target number ratio, which mixture will have a total article number and total weight equal or closest to a target number and target weight, respectively.

As many apparently widely different embodiments of the present invention may be made without departing from the spirit and scope thereof, it is to be understood that the invention is not limited to the specific embodiments thereof except as defined in the appended claims.

What we claim is:

1. A combinatorial weighing method for obtaining a final mixture of articles of plural categories, in which the articles in each category are contained in the mixture at a number ratio equal or closest to a target number ratio, the final mixture having a total weight equal or closest to a target weight, said method comprising the steps of:
   (a) setting a number of articles for each category of articles to provide a primary number ratio close to the target number ratio;
   (b) measuring the total weight of a primary mixture obtained by extracting the set number of articles in each category determined in said step (a) and mixing these articles together;
   (c) computing a weight shortfall by finding the difference between the total weight of the primary mixture and the target weight;
   (d) supplying a plurality of weighing machines with supplemental articles which are used to compensate for the weight shortfall, and selecting an optimum combination of weighing machines giving a combined weight equal or closest to the weight shortfall; and
   (e) obtaining a final mixture by discharging the supplemental articles from the selected weighing machines forming the optimum combination and mixing these supplemental articles with the primary mixture.

2. A combinatorial weighing method according to claim 1, further comprising the step of determining a supplemental number ratio of the articles constituting the supplemental articles by subtracting the primary number ratio from the target number ratio.

3. A combinatorial weighing method according to claim 2, wherein when more than one optimum combination is selected in said step (d), said step (e) comprises the substeps of:
   (e') finding the total number of articles in each of the optimum combinations;
   (e'') selecting the one optimum combination having a total number of articles equal or closest to a shortfall in the number of articles, which shortfall is the difference between a target number and the total number of articles constituting the primary mixture; and
   (e''') discharging the supplemental articles from those weighing machines belonging to the selected optimum combination.

4. A combinatorial weighing method according to claim 1, wherein when more than one optimum combination is selected in said step (d), said step (e) comprises of substeps of:

(e') finding the total number of articles in each of the optimum combinations;

(e'') selecting the one optimum combination having a total number of articles equal or closest to a shortfall in the number of articles, which shortfall is the difference between a target number and the total number of articles constituting the primary mixture; and (e''') discharging the supplemental articles from those weighing machines belonging to the selected optimum combination.

5. A combinatorial weighing method for obtaining a final mixture of articles of plural categories, in which the articles in each category and contained in the final mixture at a number ratio equal or closest to a target number ratio, the final mixture having a total number of articles and a total weight equal or closest to a target number and a target weight, respectively, said method comprising the steps of:

(a) setting a number of articles for each category of articles to provide a primary number ratio close to the target number ratio;

(b) obtaining a primary mixture by extracting the set number of articles in each category determined in said step (a) and mixing these articles together;

(c) supplying a plurality of weighing machines with supplemental articles which are used to compensate for a shortfall in the number of articles in the primary mixture, the shortfall being the difference between the target number and the total number of articles forming the primary mixture;

(d) computing the number of supplemental articles supplied to each of the weighing machines by dividing the weight of the batch of supplemental articles in each weighing machine by the mean unit weight of the articles constituting the supplemental articles:

(e) forming combinations of the numbers of supplemental articles supplied to each of the weighing machines and selecting an optimum combination having a combined number of supplemental articles equal or closest to the shortfall in the number of articles in the primary mixture; and (f) obtaining a final mixture by discharging the supplemental articles from the selected weighing machines and mixing these articles with the primary mixture.

6. A combinatorial weighing method according to claim 5, further comprising the step of determining a supplemental number ratio of the articles constituting the supplemental articles by subtracting the primary number ratio from the target number ratio.

7. A combinatorial weighing method according to claim 6, wherein said step (f) comprises the substeps of:

(f') computing a weight shortfall by finding the difference between the total weight of the primary mixture and the target weight;

(f'') finding the total weight of each of the optimum combinations when more than one optimum combination is selected in said step (e);

(f''') selecting the one optimum combination having a combined weight equal or closest to the weight shortfall; and (f'''') discharging the supplemental articles from those weighing machines belonging to the selected optimum combination.

8. A combinatorial weighing method according to claim 5, wherein said step (f) comprises the substeps of:

(f') computing a weight shortfall by finding the difference between the total weight of the primary mixture and the target weight;

(f'') finding the total weight of each of the optimum combinations when more than one optimum combination is selected in said step (e);

(f''') selecting the one optimum combination having a combined weight equal or closest to the weight shortfall; and (f'''') discharging the supplemental articles from those weighing machines belonging to the selected optimum combination.

9. A combinatorial weighing apparatus for obtaining a final mixture of articles of plural categories, in which the articles in each category are contained in the final mixture at a number ratio equal or closest to a target number ratio, the final mixture having a total weight equal or closest to a target weight, said apparatus comprising:

an automatic weighing unit including:
a first weighing hopper;
a plurality of charging hoppers for accumulating articles for the respective categories;
contiguous belt conveyor pairs disposed for conveying articles from respective ones of said charging hoppers to said first weighing hopper;
counters respectively provided adjacent said contiguous belt conveyor pairs;
first hoppers respectively positioned adjacent said counters;
one second hopper positioned adjacent said contiguous belt conveyors for temporarily retaining the articles delivered by said contiguous belt conveyor pairs, which articles constitute a primary mixture; and
a first weight sensor, coupled to said weighing hoppers for weighing the articles charged into said first weighing hopper from said second hopper; and a combinatorial weighing unit including:
n substantially equally spaced apart weighing machines disposed in a circular array along the perimeter of said combinatorial weighing unit, each weighing machine having a second weighing hopper and an associated second weight sensor, where n is an integer;
pool hoppers positioned for supplying corresponding ones of said second weighing hoppers with articles;
supply troughs positioned for supplying corresponding ones of said pool hoppers with articles in such a manner that the articles supplied differ by a constant amount from one pool hopper to another; and
a distributing feeder for distributively supplying each of the supply troughs with articles.

10. A combinatorial measuring method for obtaining a final mixture of articles of plural categories, comprising the steps of:

(a) setting a number of articles for each category of articles to provide a primary number ratio;

(b) supplying, for each category of articles, the number of articles specified by the primary ratio set in step (a), to provide a primary mixture;

(c) measuring the primary mixture to obtain a measured shortfall equal to the difference between a target measurement and the primary mixture measurement;

(d) providing batches of supplemental articles in accordance with a target number ratio for the final mixture, each of the batches of supplemental articles having a measured value;

(e) performing combinatorial computation on the measured values of the batches of supplemental articles to select an optimum combination of the batches of supplemental articles having a total measured value equal to or closest to the measured shortfall within preset allowable limits; and (f) obtaining a final mixture by discharging the supplemental articles from the selected batches of supplemental articles forming the optimum combination and mixing the supplemental articles with the primary mixture, so that the articles of each of the plural categories are contained in the final mixture at a number ratio equal to or closest to the target number ratio.

11. The combinatorial measuring method according to claim 10, wherein said step (d) includes determining a supplemental number ratio for the categories of articles constituting the supplemental articles by subtracting the primary number ratio from the target number ratio.

12. The combinatorial measuring method according to claim 11, wherein said step (c) comprises measuring the weight of the primary mixture to obtain a measured weight shortfall which is the measured shortfall and wherein said step (f) comprises the substeps of:

(f') finding the total number of supplemental articles in each of the optimum combinations when more than one optimum combination is selected in said step (e);

(f'') determining a number shortfall equal to the difference between a target number and the total number of articles forming the primary mixture;

(f''') selecting the one of the optimum combinations having a total number of articles equal or closest to the number shortfall; and (f'''') discharging the supplemental articles from those batches of articles belonging to the selected optimum combination.

13. The combinatorial measuring method as set forth in claim 11, wherein said step (c) comprises measuring the number of articles in the primary mixture to obtain a measured number shortfall which is the measured shortfall, and wherein said step (f) comprises the substeps of:

(f') finding the total weight of each of the optimum combinations when more than one optimum combination is selected in said step (e);

(f'') computing a weight shortfall by finding the difference between the total weight of the primary mixture and the target weight;

(f''') selecting the one of the optimum combinations having a combined weight equal or closest to the weight shortfall; and (f'''') discharging the supplemental articles from those batches of articles belonging to the selected optimum combination.

* * * * *

UNITED STATES PATENT AND TRADEMARK OFFICE
CERTIFICATE OF CORRECTION

PATENT NO. : 4,522,274
DATED : JUNE 11, 1985
INVENTOR(S) : SATOSHI KONISHI ET AL.

It is certified that error appears in the above-identified patent and that said Letters Patent is hereby corrected as shown below:

Col. 3, line 36, "and 5" should be --and 5,--.

Col. 5, line 36, "weight" should be --weighing--.

Col. 6, line 23, "above mentioned" should be --above-mentioned--.

Col. 7, line 10, Nrhd2," should be --$Nr_2$,--;

line 28, "weight" should be --weighing--.

Signed and Sealed this

Fifteenth Day of October 1985

[SEAL]

Attest:

DONALD J. QUIGG

Attesting Officer

Commissioner of Patents and
Trademarks—Designate